US012288277B2

(12) United States Patent
Ling et al.

(10) Patent No.: US 12,288,277 B2
(45) Date of Patent: Apr. 29, 2025

(54) HIGH-PRECISION SEMANTIC IMAGE EDITING USING NEURAL NETWORKS FOR SYNTHETIC DATA GENERATION SYSTEMS AND APPLICATIONS

(71) Applicant: NVIDIA Corporation, Santa Clara, CA (US)

(72) Inventors: Huan Ling, Toronto (CA); Karsten Kreis, Vancouver (CA); Daiqing Li, Oakville (CA); Seung Wook Kim, Toronto (CA); Antonio Torralba Barriuso, Somerville, MA (US); Sanja Fidler, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 221 days.

(21) Appl. No.: 17/827,394

(22) Filed: May 27, 2022

(65) Prior Publication Data

US 2022/0383570 A1 Dec. 1, 2022

Related U.S. Application Data

(60) Provisional application No. 63/194,737, filed on May 28, 2021.

(51) Int. Cl.
*G06T 7/10* (2017.01)
*G06T 11/60* (2006.01)
(Continued)

(52) U.S. Cl.
CPC ............... *G06T 11/60* (2013.01); *G06T 7/10* (2017.01); *G06V 10/774* (2022.01);
(Continued)

(58) Field of Classification Search
CPC ...................... G06T 7/10; G06T 2207/20021
See application file for complete search history.

(56) References Cited

U.S. PATENT DOCUMENTS

| 2022/0108417 | A1* | 4/2022 | Liu ........................ G06T 1/0007 |
| 2022/0383570 | A1 | 12/2022 | Ling et al. |
| 2023/0342986 | A1* | 10/2023 | Pinto ................ G06V 30/19173 |

FOREIGN PATENT DOCUMENTS

WO 2022251693 A1 12/2022

OTHER PUBLICATIONS

Lee et al., MaskGAN: Towards Diverse and Interactive Facial Image Manipulation, Jul. 27, 2019, Computer Vision and Pattern Recognition (cs.CV); Graphics (cs.GR); Machine Learning (cs.LG), pp. 1-20 (Year: 2019).*

(Continued)

*Primary Examiner* — Matthew Salvucci
(74) *Attorney, Agent, or Firm* — Taylor English Duma L.L.P.

(57) ABSTRACT

In various examples, high-precision semantic image editing for machine learning systems and applications are described. For example, a generative adversarial network (GAN) may be used to jointly model images and their semantic segmentations based on a same underlying latent code. Image editing may be achieved by using segmentation mask modifications (e.g., provided by a user, or otherwise) to optimize the latent code to be consistent with the updated segmentation, thus effectively changing the original, e.g., RGB image. To improve efficiency of the system, and to not require optimizations for each edit on each image, editing vectors may be learned in latent space that realize the edits, and that can be directly applied on other images with or without additional optimizations. As a result, a GAN in combination with the optimization approaches described herein may (Continued)

simultaneously allow for high precision editing in real-time with straightforward compositionality of multiple edits.

20 Claims, 8 Drawing Sheets

(51) Int. Cl.
    *G06V 10/774*     (2022.01)
    *G06V 10/776*     (2022.01)
(52) U.S. Cl.
    CPC ........ *G06V 10/776* (2022.01); *G06T 2200/24* (2013.01); *G06T 2207/20021* (2013.01); *G06T 2207/20081* (2013.01); *G06T 2207/20084* (2013.01)

(56) References Cited

OTHER PUBLICATIONS

Wang, et al.; "High-Resolution Image Synthesis and Semantic Manipulation with Conditional GANs"; https://arxiv.org/abs/1711.11585; Aug. 20, 2018, 14 pgs.
Luan, et al.; "Deep Photo Style Transfer"; https://arxiv.org/abs/1703.07511; Apr. 11, 2017, 9 pgs.
Liu, et al.; "Unsupervised Image-to-Image Translation Networks"; https://arxiv.org/abs/1703.00848; Jul. 23, 2018, 11 pgs.
Li, et al.; "A Closed-Form Solution to Photorealistic Image Stylization"; https://arxiv.org/abs/1802.06474; Jul. 27, 2018, 23 pgs.
Kazemi, et al.; "Style and Content Disentanglement in Generative Adversarial Networks"; https://arxiv.org/abs/1811.05621; Nov. 14, 2018, 9 pgs.
Yoo, et al.; "Photorealistic Style Transfer via Wavelet Transforms"; https://arxiv.org/abs/1903.09760; Sep. 29, 2019, 17 pgs.
Perarnau, et al.; "Invertible Conditional GANs for Image Editing"; https://arxiv.org/abs/1611.06355; Nov. 19, 2016, 9 pgs.
Donahue, et al.; "Adversarial Feature Learning"; https://arxiv.org/abs/1605.09782; Apr. 3, 2017, 18 pgs.
Brock, et al.; "Neural Photo Editing with Introspective Adversarial Networks"; https://arxiv.org/abs/1609.07093; Feb. 6, 2017, 15 pgs.
Dumoulin, et al.; "Adversarially Learned Inference"; https://arxiv.org/abs/1606.00704; Feb. 21, 2017, 18 pgs.
Richardson, et al.; "Encoding in Style: A StyleGAN Encoder for Image-To-Image Translation"; https://arxiv.org/abs/2008.00951; Apr. 21, 2021, 21 pgs.
Zhu, et al.; "Generative Visual Manipulation on the Natural Image Manifold"; https://arxiv.org/abs/1609.03552; Dec. 16, 2018, 16 pgs.
Yeh, et al.; "Semantic Image Inpainting with Deep Generative Models"; https://arxiv.org/abs/1607.07539; Jul. 13, 2017, 19 pgs.
Lipton, et al.; "Precise Recovery of Latent Vectors from Generative Adversarial Networks"; https://arxiv.org/abs/1702.04782; Feb. 17, 2017, 4 pgs.
Abdal, et al.; "Images2StyleGAN: How to Embed Images into the StyleGAN Latent Space?"; https://arxiv.org/abs/1904.03189; Sep. 2, 2019, 23 pgs.
Huh, et al.; "Transforming and Projecting Images into Class-conditional Generative Networks"; https://arxiv.org/abs/2005.01703; Aug. 27, 2020, 27 pgs.
Creswell, et al.; "Inverting the Generator of A Generative Adversarial Network"; https://arxiv.org/abs/1611.05644; Nov. 17, 2016, 9 pgs.
Raj; et al.; "GAN-Based Projector for Faster Recovery with Convergence Guarantees in Linear Inverse Problems"; In 2019 IEEE/CVF International Conference on Computer Vision (ICCV), pp. 5601-5610, 2019; 10 pgs.
Bau, et al.; "Seeing What A Gan Cannot Generate"; In 2019 IEEE/CVF International Conference on Computer Vision (ICCV), pp. 4501-4510, 2019, 10 pgs.
Zhu, et al.; "In-Domain GAN Inversion for Real Image Editing"; https://arxiv.org/abs/2004.00049; Jul. 16, 2020, 31 pgs.
Deng, et al.; "ArcFace: Additive Angular Margin Loss for Deep Face Recognition"; https://arxiv.org/abs/1801.07698; Sep. 4, 2022; 17 pgs.
Kingma, et al.; "Adam: A Method for Stochastic Optimization"; https://arxiv.org/abs/1412.6980; Jan. 30, 2017, 15 pgs.
Seitzer; "Pytorch-FID: FID Score for PyTorch"; https://github.com/mseitzer/pytorch-fid; Aug. 2020; Version 0.1.1.; 4 pgs.
Heusel, et al.; "GANs Trained by a Two Time-Scale Update Rule Converge to a Local Nash Equilibrium"; https://arxiv.org/abs/1706.08500; Jan. 12, 2018, 38 pgs.
Vaccari, et al.; "Deepfakes and Disinformation: Exploring the Impact of Synthetic Political Video on Deception, Uncertainty, and Trust in News"; Social Media + Society, Jan.-Mar. 2020; 13 pgs.
Nguyen, et al.; "Deep Learning for Deepfakes Creation and Detection: A Survey"; https://arxiv.org/abs/1909.11573; Aug. 11, 2022, 19 pgs.
Mirsky, et al.; "The Creation and Detection of Deepfakes: A Survey"; https://arxiv.org/abs/2004.11138; Sep. 13, 2020; 38 pgs.
Grover, et al.; "Bias Correction of Learned Generative Models using Likelihood-Free Importance Weighting"; https://arxiv.org/abs/1906.09531; Nov. 3, 2019, 18 pgs.
Choi, et al.; "Fair Generative Modeling via Weak Supervision"; https://arxiv.org/abs/1910.12008; Jun. 30, 2020; 22 pgs.
Yu, et al.; "Inclusive GAN: Improving Data and Minority Coverage in Generative Models"; https://arxiv.org/abs/2004.03355; Aug. 23, 2020; 22 pgs.
Lee, et al.; "Self-Diagnosing GAN: Diagnosing Underrepresented Samples in Generative Adversarial Networks"; https://arxiv.org/abs/2102.12033; Oct. 26, 2021; 34 pgs.
Ling, Huan; International Search Report and Written Opinion for PCT Patent Application No. PCT/US2022/031427, filed May 27, 2022, mailed Sep. 15, 2022, 11 pgs.
Rameen Abdal et al.; "StyleFlow: Attribute-conditioned Exploration of StyleGAN-Generated Images using Conditional Continuous Normalizing Flows", ARXIV.org, Cornell University Library; Sep. 20, 2020, 22 pgs.
David Bau et al.: "Paint by Word", ARXIV.org, Mar. 24, 2021, 10 pgs.
Daiqing Li et al: "Semantic Segmentation with Generative Models: Semi-Supervised Learning and Strong Out-of-Domain Generalization" ARXIV.org; Cornell University Library, Apr. 12, 2021, 12 pgs.
Jianjin Xu et al: "Linear Semantics in Generative Adversarial Networks", ARXIV.org, Cornell University Library, Apr. 1, 2021, 23 pgs.
Karras, et al., "A Style-Based Generator Architecture for Generative Adversarial Networks", https://arxiv.org/abs/1812.04948, Mar. 29, 2019, 12 pgs.
Zhang, et al., "The Unreasonable Effectiveness of Deep Features as a Perceptual Metric", https://arxiv.org/abs/1801.03924, Apr. 10, 2018, 14 pgs.
Zhang, et al., "DatasetGAN: Efficient Labeled Data Factory with Minimal Human Effort", https://arxiv.org/abs/2104.06490, Apr. 20, 2021, 11 pgs.
Bailey; "The Tools of Generative Art, from Flash to Neural Networks", Art in America, https://www.artnews.com/art-in-america/features/generative-art-tools-flash-processing-neural-networks-1202674657/; Jan. 8, 2020, 7 pgs.
Goodfellow, et al., "Generative Adversarial Nets", In Advances in neural information processing systems, 2014, 9 pgs.
Radford, et al., "Unsupervised Representation Learning with Deep Convolutional Generative Adversarial Networks", https://arxiv.org/abs/1511.06434; Jan. 7, 2016, 16 pgs.
Kerras, et al., "Growing of Gans for Improved Quality, Stability, and Variation", https://arxiv.org/abs/1710.10196, Feb. 26, 2018, 26 pgs.
Karras, et al., "Analyzing and Improving the Image Quality of StyleGAN", https://arxiv.org/abs/1912.04958, Mar. 23, 2020, 21 pgs.
Choi, et al., "StarGAN: Unified Generative Adversarial Networks for Multi-Domain Image-to-Image Translation", https://arxiv.org/abs/1711.09020, Sep. 21, 2018, 15 pgs.
Lee, et al., "MaskGAN: Towards Diverse and Interactive Facial Image Manipulation", https://arxiv.org/abs/1907.11922, Apr. 1, 2020, 20 pgs.

(56) References Cited

OTHER PUBLICATIONS

Wu, et al., "Cascade EF-GAN: Progressive Facial Expression Editing with Local Focuses", https://arxiv.org/abs/2003.05905, Mar. 25, 2020, 18 pgs.
Shen, et al., "Interpreting the Latent Space of GANs for Semantic Face Editing", https://arxiv.org/abs/1907.10786, Mar. 31, 2020, 12 pgs.
Shen, et al., "InterFaceGAN: Interpreting the Disentangled Face Representation Learned by GANs", https://arxiv.org/abs/2005.09635, Oct. 29, 2020, 16 pgs.
Alharbi, et al., "Disentangled Image Generation Through Structured Noise Injection", In Porceedings of the IEEE/CVF Conference on Computer Vision and Pattern Recognition (CVPR), Jun. 2020, 9 pgs.
Hou, et al., "GuidedStyle: Attribute Knowledge Guided Style Manipulation for Semantic Face Editing", https://arxiv.org/abs/2012.11856, Dec. 22, 2020, 10 pgs.
Cherepkov, et al., "Navigating the GAN Parameter Space for Semantic Image Editing", In IEEE/CVF Conference on Computer Vision and Pattern Recognition (CVPR), 2021, 10 pgs.
Collins, et al., "Editing in Style: Uncovering the Local Semantics of GANs", https://arxiv.org/abs/2004.14367, May 21, 2020, 23 pgs.
Zhu, et al., "SEAN: Image Synthesis with Semantic Region-Adaptive Normalization", https://arxiv.org/abs/1911.12861, May 24, 2020, 19 pgs.
Lewis, et al., "Vogue: Try-on by StyleGAN Interpolation Optimization", arXiv preprint arXiv:2101.02285, 2021, 15 pgs.
Kim, et al., "Exploiting Spatial Dimensions of Latent in GAN for Real-time Image Editing", https://arxiv.org/abs/2104.14754, Jun. 23, 2021, 25 pgs.
Chen, et al., "DeepFaceDrawing: Deep Generation of Face Images from Sketches", ACM Trans. Graph., Art. 39, Jun. 5, 2020, 16 pgs.
He, et al., "AttGAN: Facial Attribute Editing by Only Changing What You Want", https://arxiv.org/abs/1711.10678, Jul. 25, 2018, 16 pgs.
Bau, et al., "GAN Dissection: Visualizing and Understanding Generative Adversarial Networks", https://arxiv.org/abs/1811.10597, Dec. 8, 2018, 18 pgs.
Bau, et al., "Semantic Photo Manipulation with a Generative Image Prior", https://arxiv.org/abs/2005.07727, Sep. 12, 2020, 11 pgs.
Plumerault, et al., "Controlling Generative Models with Continuous Factors of Variations", https://arxiv.org/abs/2001.10238, Jan. 28, 2020, 17 pgs.
Harkonen, et al., "GANSpace: Discovering Interpretable GAN Controls", https://arxiv.org/abs/2004.02546, Dec. 14, 2020, 29 pgs.
Bau, et al., "Rewriting A Deep Generative Model", https://arxiv.org/abs/2007.15646, Jul. 30, 2020, 31 pgs.
Efros, et al., "Image Quilting for Texture Synthesis and Transfer", SIGGRAPH '01, p. 341-346, New York, NY USA, 2001. Association for Computing Machinery, 6 pgs.
Hertzmann, et al., "Image Analogies", https://www.researchgate.net/publication/2406594_Image_Analogies, 2001, 14 pgs.
Reinhard, et al., "Color Transfer Between Images", IEEE Computer Graphics and Applications, vol. 21, 2001, 9 pgs.
Perez, et al., "Poisson Image Editing", SIGGRAPH '03, p. 313-318, New York, NY, USA, 2003. Association for Computing Machinery. 6 pgs.
Schaefer, et al., "Image Deformation Using Moving Least Squares", ACM Trans. Graph., Art. 25, 2006, 8 pgs.
Barnes, et al., "Patchmatch: A Randomized Correspondence Algorithm for Structural Image Editing", ACM Trans. Graph., Art. 28, 2009, 10 pgs.
Tao, et al., "Error-tolerant Image Compositing", in ECCV, 2010, 14 pgs.
Gatys, et al., "Image Style Transfer Using Convolutional Neural Networks", in 2016 IEEE Conference on Computer Vision and Pattern Recognition (CVPR), 2016, 10 pgs.
Zhu, et al., "Unpaired Image-to-Image Translation Using Cycle-Consistent Adversarial Networks", https://arxiv.org/abs/1703.10593, Aug. 27, 2020, 18 pgs.
Portenier, et al., "FaceShop:Deep Sketch-based Face Image Editing", https://arxiv.org/abs/1804.08972, Jun. 7, 2018, 13 pgs.
Ling, et al., "Variational Amodal Object Completion", Advances in Neural Information Processing Systems, 2020, 12 pgs.
Park, et al., "Swapping Autoencoder for Deep Image Manipulation", https://arxiv.org/abs/2007.00653, Dec. 14, 2020, 23 pgs.
Kim, et al.; "DriveGAN: Towards a Controllable High-Quality Neural Simulation", https://arxiv.org/abs/2104.15060; Apr. 30, 2021, 16 pgs.
Kingma, et al.; "Auto-Encoding Variational Bayes", https://arxiv.org/abs/1312.6114; May 1, 2014, 14 pgs.
Rezende, et al.; "Stochastic Backpropagation and Approximate Inference in Deep Generative Models", https://arxiv.org/abs/1401.4082; May 30, 2014, 14 pgs.
Brock, et al.; "Large Scale GAN Training for High Fidelity Natural Image Synthesis", https://arxiv.org/abs/1809.11096; Feb. 25, 2019, 35 pgs.
Park, et al.: "Semantic Image Synthesis with Spatially-Adaptive Normalization", https://arxiv.org/abs/1903.07291; Nov. 5, 2019, 19 pgs.
Goetschalckx, et al.; "GANalyze: Toward Visual Definitions of Cognitive Image Properties", https://arxiv.org/abs/1906.10112; Jun. 24, 2019, 17 pgs.
Jahanian, et al.; "On the 'Steerability' of Generative Adversarial Networks"; https://arxiv.org/abs/1907.07171, Feb. 17, 2020, 31 pgs.
Voynov, et al.; "Unsupervised Discovery of Interpretable Directions in the GAN Latent Space"; https://arxiv.org/abs/2002.03754; Jun. 24, 2020, 15 pgs.
Shen, et al.; "Closed-Form Factorization of Latent Semantics in GANs"; https://arxiv.org/abs/2007.06600; Apr. 3, 2021, 9 pgs.
Ling, Huan; International Preliminary Report on Patentability for PCT Application No. PCT/US2022/031427, filed May 27, 2022, mailed Dec. 7, 2023, 8 pgs.

\* cited by examiner

HIGH-PRECISION SEMANTIC IMAGE EDITING USING NEURAL NETWORKS FOR SYNTHETIC DATA GENERATION SYSTEMS AND APPLICATIONS

CROSS-REFERENCE TO RELATED APPLICATIONS

This application claims the benefit of U.S. Provisional Application No. 63/194,737, filed on May 28, 2021, the contents of which are hereby incorporated by reference in their entirety.

This application is related to U.S. Non-Provisional application Ser. No. 17/019,120, filed on Sep. 11, 2020, and U.S. Non-Provisional application Ser. No. 17/020,649, filed on Sep. 14, 2020, the contents of which are hereby incorporated by reference in their entirety.

BACKGROUND

Artificial intelligence (AI) driven photo and image editing is used to streamline the workflow for photographers and content creators to allow for creativity and digital artistry. For example, AI-based image editing tools—such as neural photo editing filters—have been used in consumer software. Recently, generative adversarial networks (GANs) have been used in image editing, and either embed images into a GAN's latent space, or work directly with GAN-generated images. Modifications of latent embeddings may then be translated to desired changes in an output, e.g., to change facial expressions, viewpoint or shapes and textures and cars, or to interpolate between different images.

Most GAN-based image editing methods either rely on conditional GANs to compute class labels or pixel-wise semantic segmentation annotations, where different conditions lead to modification in the output, while others use auxiliary attribute classifiers to guide synthesis and edit images. However, training such conditional GANs or external classifiers requires large labeled datasets, thereby limiting these approaches to image types for which large annotated datasets are available (e.g., portraits). In addition, even where annotations are available, some techniques offer only limited editing control due to the annotations consisting only of high level global attributes or relatively coarse pixel-wise segmentations.

Another approach using GANs focuses on mixing and interpolating features from different images, thereby requiring reference images as editing targets. However, these approaches do not offer fine control. Other methods carefully analyze and dissect a GAN's latent space, finding disentangled variables suitable for editing, or control the GAN's network parameters. However, these methods generally do not allow for detailed editing, and are compute and time intensive.

SUMMARY

Embodiments of the present disclosure relate to high-precision semantic image editing for machine learning systems and applications. Systems and methods are disclosed that allow for high-precision semantic image editing based on user-provided modifications to detailed object part segmentations. A generative adversarial network (GAN) may be used to jointly model images and their semantic segmentations based on a same underlying latent code. Once trained using, e.g., unannotated images, the GAN may generate these joint outputs using few annotated samples—e.g., only 16 annotated samples—allowing the technique to scale to many object classes and choices of part labels for editing. The image editing may be achieved by using segmentation mask modifications (e.g., provided by a user, or otherwise) to optimize the latent code to be consistent with the updated segmentation, thus effectively changing the original, e.g., RGB image. To improve efficiency of the system, and to not require optimizations for each edit on each image, editing vectors may be learned in latent space that realize the edits and that can be directly applied on other images with or without additional optimizations. As such, a library of pre-trained editing vectors may be generated that a user can directly use in an interactive tool for editing images in real-time or near real-time using an editing tool. As a result, a GAN in combination with the optimization approaches described herein may simultaneously allow for high precision editing, require little annotated data (without reliance on external classifiers), be run interactively in real-time, allow for straightforward compositionality of multiple edits, and work on real embedded, GAN-generated, and/or out-of-domain images.

In practice, an input image may be embedded into the latent space of a GAN, and the GAN may generate two outputs—an image corresponding to the input image and a segmentation mask corresponding to the generated image. One or more edits may be made to the segmentation mask, and optimizations—e.g., using one or more loss functions—may be performed to determine an editing vector from a point in the latent space corresponding to the embedded input image to a point in the latent space corresponding to the edited segmentation mask. The editing vector may thus represent the difference between the original and edited images in the latent space of the GAN, and the GAN may then generate an updated output image corresponding to the point in the latent space identified using the editing vector. In embodiments, the editing vector may be stored for use with other input images that have similar edits performed on their corresponding segmentation masks—e.g., an "enlarged wheels on car" editing vector may be used on any image of a car input to the GAN to generate enlarged wheels. The accuracy of the generated outputs may be increased by disentangling the edited features from other features in the latent space using one or more loss functions. For example, the loss functions may include a first loss function (e.g., a cross entropy loss function) for ensuring edited areas are represented differently in the latent space and second loss function (e.g., an RGB loss function) for ensuring that areas outside of the edited areas are represented similarly before and after the edits. In this way, the updated values of the editing vectors are primarily related to the edits, and values in the latent space corresponding to the unedited regions remain mostly unchanged.

BRIEF DESCRIPTION OF THE DRAWINGS

The present systems and methods for high-precision semantic image editing for machine learning systems and applications are described in detail below with reference to the attached drawing figures, wherein.

DETAILED DESCRIPTION

Figure 1A:
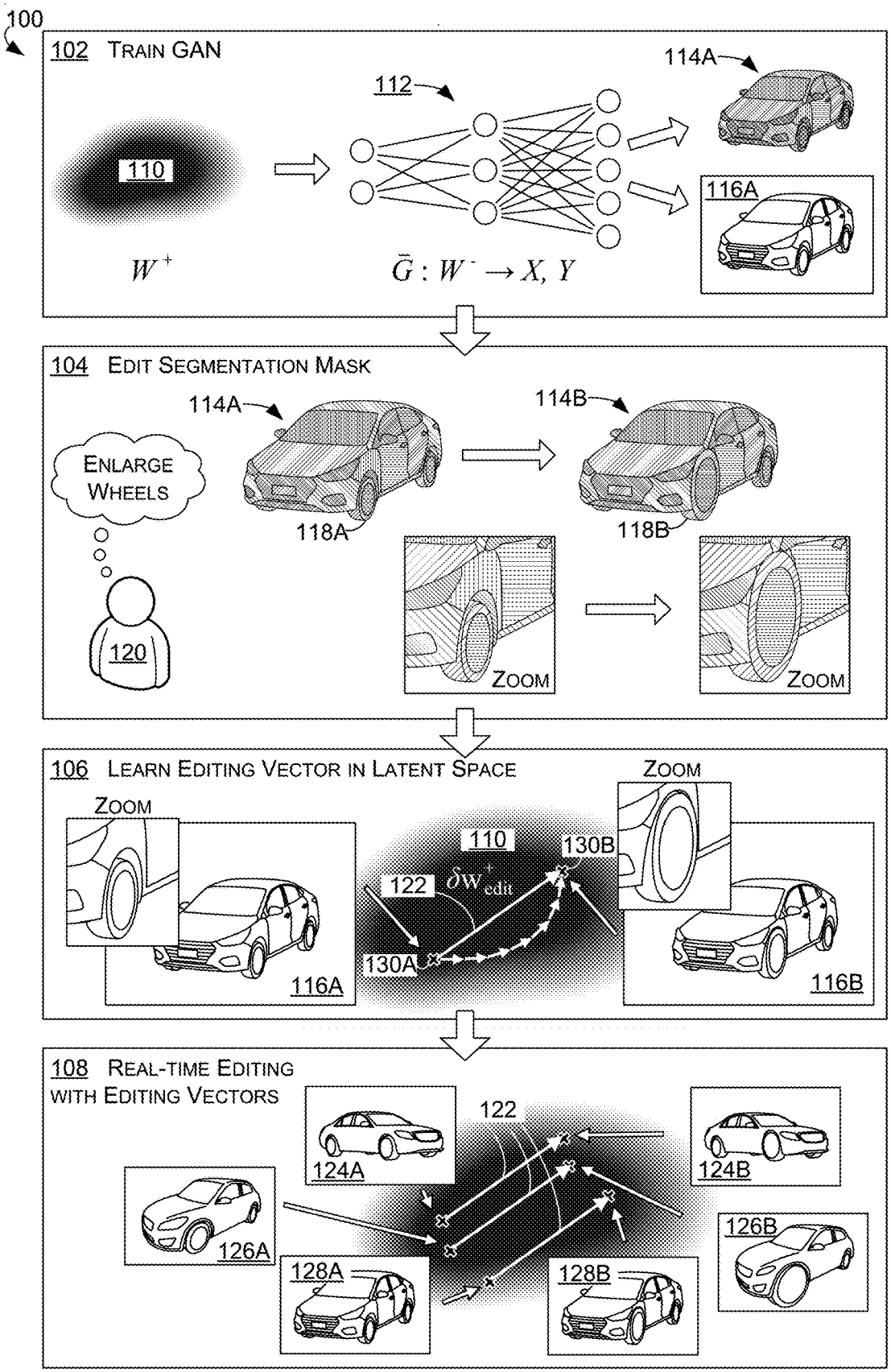
FIG. 1A illustrates a process flow for learning an editing vector in a latent space of a generative adversarial network, in accordance with some embodiments of the present disclosure.

Systems and methods are disclosed related to high-precision semantic image editing for machine learning systems and applications. The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Although a generative adversarial model (GAN) is primarily described as the machine learning model or deep neural network (DNN) herein, this is not intended to be limiting, and other types of machine learning models or DNNs may be used without departing from the scope of the present disclosure. For example, and without limitation, any type of machine learning model may be used, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short-term Memory (LSTM), Hopfield, Boltzmann, deep belief, deconvolutional, generative adversarial, liquid state machine, etc.), and/or other types of machine learning models. In addition, the descriptions of GANs (e.g., GAN 112) herein are provided as examples, and are not intended to limit the scope of the present disclosure. For example, the GANs described herein may include any architecture and/or may be trained using any number of loss functions and/or optimization algorithms.

With reference to FIG. 1, FIG. 1 illustrates a process 100 for learning an editing vector in a latent space of a generative adversarial network, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the process 100 of FIG. 1 may be executed using similar components, features, and/or functionality as that of example computing device 500 of FIG. 5 and/or example data center 600 of FIG. 6.

The process 100 may be used for high quality, high precision semantic image editing, allowing users to edit images by modifying their highly detailed part segmentation masks—e.g., by drawing a new mask for a headlight of a car that changes the shape, size, and/or location of the headlight. The generative adversarial network (GAN) 112 used in the process may jointly model images and their semantic segmentations, and may do so (after training with unlabeled samples) with limited labeled samples—thereby allowing for easier scalability. At a high level, the process 100 may include embedding an image into a GANs 112 latent space 110, and condition latent code optimization may be executed according to an edit(s) to the segmentation mask. As a result, the corresponding image generated by the jointly modeled GAN may also be modified to match the edits to segmentation mask. To memorialize or amortize the optimization for a given edit, one or more editing vectors 122 may be learned in the latent space 110 that realize the edits. This framework allow for learning any number of editing vectors corresponding to any number of different edit types (e.g., enlarge wheels, shrink headlights, remove trunk of sedan, add a smile to a person, change gaze direction of a person, add frown to image depicting a painting or other out-of-domain image type, etc.). As a result of the process 100, the GAN 112 may be used to manipulate images with a high level of detail and freedom, including performing edits beyond those represented in the GAN's training data.

The process 100 includes training a GAN (e.g., GAN 112) 102, editing a segmentation mask 104 (e.g., editing a segmentation mask 114A output by the GAN 112 to generate an updated segmentation mask 114B), learning an editing vector in latent space 106 (e.g., learning an editing vector 122—e.g., between a first point 130A in the latent space 110 corresponding to an initial image 116A and a second point 130B in the latent space 110 corresponding to a second image 116B—in the latent space 110 that memorializes the edits to the segmentation mask 114A), and performing real-time editing with editing vectors 108 (e.g., the learned editing vector(s) 122 may be used to perform similar edit types on other embedded images).

When training the GAN 102, the generator of the GAN may map latent codes z E Z, drawn from a multivariate normal distribution, into realistic images. A latent code, z, may first be transformed into an intermediate code w E W by a non-linear mapping function and then further transformed into K+1 vectors, $w^0, \ldots, w^k$, through learned affine transformations. These transformed latent codes may be fed into synthesis blocks, whose outputs are deep feature maps. In this way, the GAN 112 may be trained to synthesize highly realistic images, and may acquire a semantic understanding of the modeled images in their high-dimensional feature space. The GAN 112 may further learn a joint distribution p(x, y) over images x and pixel-wise semantic segmentation labels y, while requiring only a handful of labeled examples. The GAN 112 may thus use the joint distribution p(x, y) to perform high-precision semantic image editing of real and synthesized images. As such, the GAN 112 may model p(x, y) by adding an additional segmentation branch to the image generator. The GAN 112 may be pre-trained, in embodiments, using unlabeled training samples. In some embodiments, the GAN 112 may apply a three-layer multi-layer perceptron classifier on the layer-wise concatenated and up-sampled feature maps. The classifier may operate on the concatenated feature maps in a per-pixel fashion and may predict the segmentation label of each pixel—as represented in a segmentation mask 114. In some embodiments, without limitations, the GAN 112 may be similar to that of U.S. Non-Provisional application Ser. No. 17/019,120, filed on Sep. 11, 2020, and/or U.S. Non-Provisional application Ser. No. 17/020,649, filed on Sep. 14, 2020, the contents of which are hereby incorporated by reference in their entirety.

Further, to train the GAN 102 and to perform segmentation on a new image, an input or original image may be embedded into the latent space 110 of the GAN 112 using, for example, an encoder and optimization. As such, the encoder may be trained to embed images into the latent space 110, $W^+$, which is defined as W where the w's are modeled independently. In embodiments, the objectives of training the encoder include standard pixel-wise L2 and perceptual LPIPS reconstruction losses using both the real training data as well as samples from the GAN 112 itself. For the GAN samples, the encoder may be explicitly regularized with the known underlying latent codes. The encoder may be used to initialize an image's latent space embeddings, and then to iteratively refine the latent code $w^+$ via optimization, using, e.g., standard reconstruction objectives.

As such, annotated images, x, may be embedded from a dataset labeled with semantic segmentations into the latent space 110, and the semantic segmentation branch of the generator of the GAN 112 may be trained using, e.g., standard supervised learning objectives (e.g., cross entropy loss). In embodiments, during training, the image generator's weights (e.g., weights corresponding to the image generation branch of the GAN 112) may be frozen and only the loss of the segmentation branch be backpropagated. After the semantic segmentation branch is trained, the generator of the GAN 112 may be defined as $\tilde{G}:W^+ \rightarrow X, Y$ that models the joint distribution p(x, y) of images x and semantic segmentations y.

The process 100 includes editing the segmentation mask 104. For example, the segmentation mask 114A generated by the semantic segmentation branch of the GAN 112 may by edited by, e.g., a user 120, and/or may be edited using an automated editing process to generate the edited segmentation mask 114B—denoted as $y_{edited}$, in examples. The edit(s) may include adjustments to one or more features of one or more objects represented in the segmentation mask 114A and/or the generated image 116A. For example, with respect to a vehicle, the edit(s) may be to a wheel (e.g., to change a size, shape, or location), to a headlight(s), to an overall shape of the vehicle (e.g., to cut off a rear end, make the vehicle longer or shorter, etc.), to remove side view mirrors, and/or the like. As another example, for a person, or an out-of-domain representation of a person or other object, the edit(s) may include changing a gaze direction, changing a hair style, changing a head angle, changing a mouth shape (e.g., smile, frown, etc.), closing eyes or opening eyes, and/or other edits. The edits may be made using interactive digital painting or labeling tools, in examples, to manually modify the segmentation according to a desired edit. In other examples, the edits may be made automatically, with or without user input.

Figure 2A:
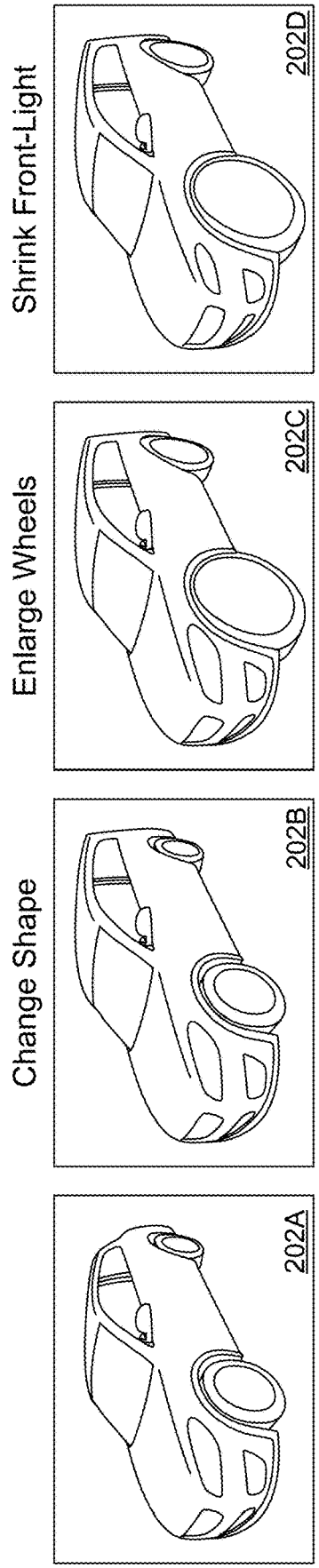
FIG. 2A illustrates an original image of a vehicle and edited images of the vehicle generated using a generative adversarial network, in accordance with some embodiments of the present disclosure.
Figure 2B:
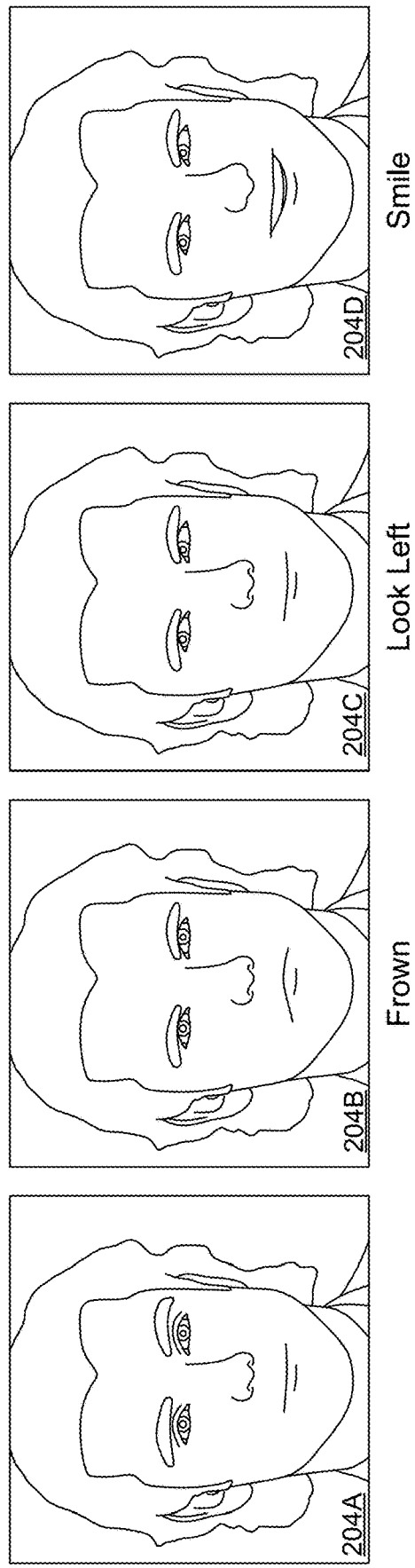
FIG. 2B illustrates an original image of a person and edited images of the person generated using a generative adversarial network, in accordance with some embodiments of the present disclosure.
Figure 2C:
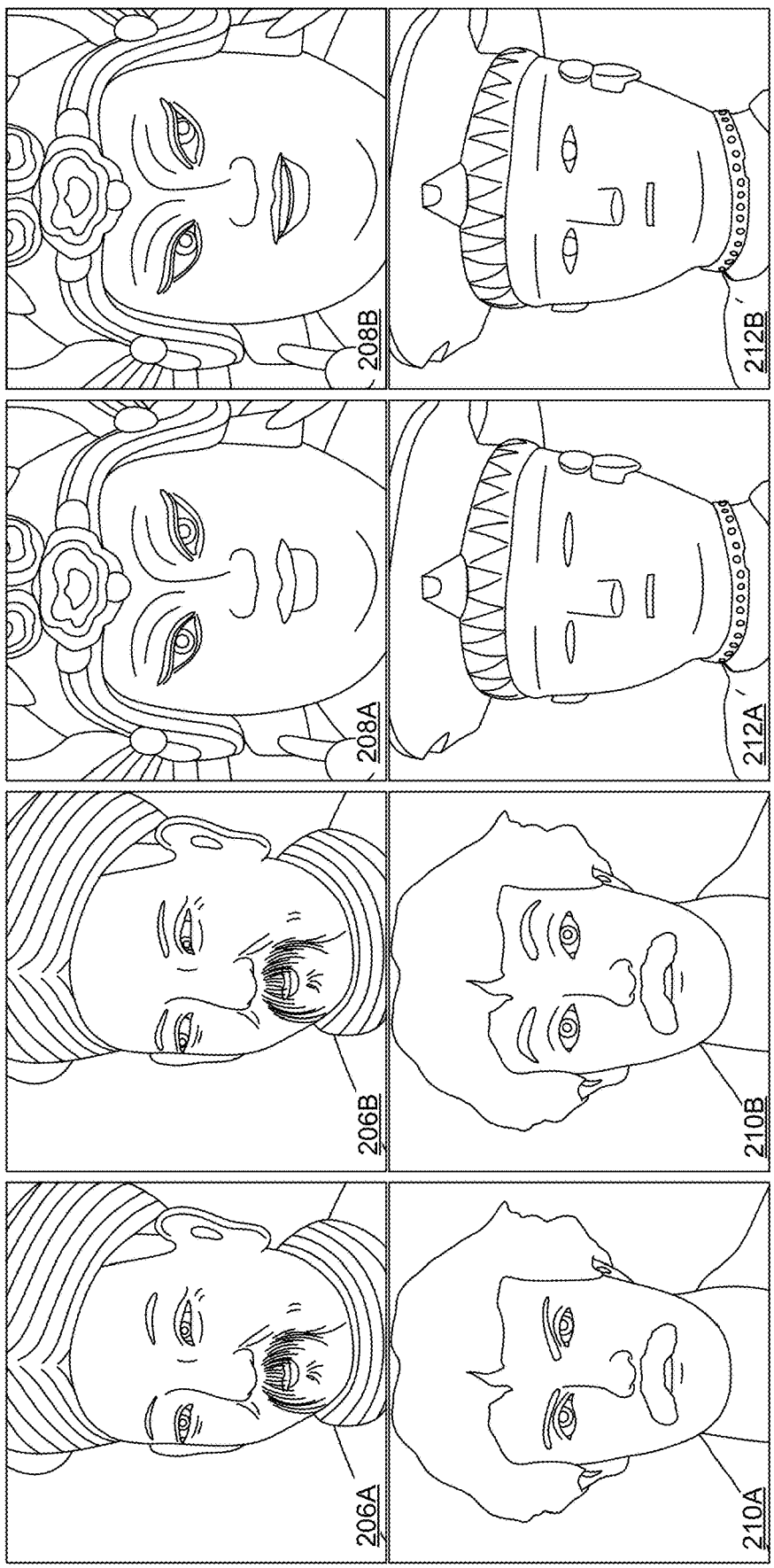
FIG. 2C illustrates original out-of-domain images and corresponding edited images generated using a generative adversarial network, in accordance with some embodiments of the present disclosure.

As examples, FIGS. 2A-2C illustrate various original images 202A, 204A, 206A, 208A, 210A, and 212A, and varying edited images generated using the GAN 112 based on edits to respective segmentation masks. For example, in FIG. 2A, a vehicle in original image 202A may have its shape changed in image 202B, its wheels enlarged in image 202C, and/or its front light shrunk in image 202D. As another example, in FIG. 2B, a person in original image 204A may have a frown in image 204B, a change in gaze direction to the left in image 204C, and/or a smile in image 204D. As further example of out-of-domain images (e.g., images of artwork, abstract art, etc.), FIG. 2C includes an original image 206A corresponding to a drawing of a person, with an image 206B corresponding to a drawing of the person looking left. FIG. 2C further includes an original image 208A corresponding to a picture of a sculpture of a person, with an image 208B corresponding to the person looking to the right with a smile. Original image 210A corresponds to an image of a drawing of a person, with image 210B corresponding to the drawing of the person opening his eyes and lifting his eyebrows. FIG. 2C further includes an original image 212A corresponding to an image of a sculpture of a person with closed eyes, with an image 212B corresponding to the sculpture with open eyes. As such, based on edits to segmentation masks corresponding to the original images, the latent space 110 editing vectors may be found in order to find a point in the latent space 110 that realizes the edit(s) and allows the GAN 112 to generate the secondary images. These editing vectors 122 may then be used on other images of a same type to realize similar edits—e.g., an editing vector 122 used to find a point in the latent space for opening the eyes of the person from the original image 210A may be repurposed for finding a point in the latent space 110 for opening the eyes of the person from the original image 212A.

To learn an editing vector in latent space 106, the process 100 may include, starting from the embedding $w^+$ of the original, unedited image x and the segmentation y, performing optimization within $W^+$ to find a new $w_{edited}^+ = W^+ + \delta w_{edit}^+$ consistent with the new segmentation $y_{edited}$, while allowing the image output x (e.g., of the image generation branch of the GAN 112) to change within an editing region(s) corresponding to the edit(s). To learn the editing vector, $\delta w_{edit}^+$, an editing vector $\delta w_{edit}^+ \in W^+$ may be optimized for such that $(x_{edited}, y_{edited}) = \tilde{G}(w^+ \delta w_{edit}^+)$, where $\tilde{G}$ denotes the fixed generator that synthesizes both image and segmentation outputs of the GAN 112. Defining $(x', y') = \tilde{G}(w^+ + \delta w^+)$, optimization may be performed to approximate $\delta w_{edit}^+$ by $\delta w^+$. The region(s) of interest (e.g., the editing region corresponding to the edit(s)), r, within which the generated image is expected to change may be formally represented by equation (1), below:

$$r = \{p : c_p^y \in Q_{edit}\} \cup \{p : c_p^{y_{edited}} \in Q_{edit}\} \quad (1)$$

which means that r is defined by all pixels p whose part segmentation labels $c_p^{\{y, y_{edited}\}}$ according to either the initial segmentation y (e.g., segmentation mask 114A) or the edited segmentation $y_{edited}$ (e.g., segmentation mask 114B) are within an edit-specific pre-specified list $Q_{edit}$ of part labels relevant for the edit(s). For example, when modifying a wheel in image 116B, $Q_{edit}$ may include all part labels related to the wheels, such as tire, spoke, and wheelhub. In embodiments, an addition buffer of, for example, and without limitation, five pixels may be used to give the GAN 112 freedom in modeling the transition between the edited and non-edited area. In practice, r acts as a binary pixel-wise mask. In such examples, $x_{edited}$ (e.g., the edited image 116B) may not be available during optimization, as $x_{edited}$ corresponds to the edited image of interest that the editing vector 122 is optimized to help generate. As such, $x_{edited}$ emerges when optimizing for the segmentation modification, since images and segmentations are closely tied together in the joint distribution $p(x, y)$ modeled by $\tilde{G}$. In addition, x' may be defined as $x' = \tilde{G}^x(w^+ + \delta w^+)$ as $\tilde{G}$'s image generation branch and y' may be defined as $y' = \tilde{G}^y(w^+ + \delta w^+)$ as $\tilde{G}$'s segmentation generation branch.

To find $\delta w^+$, approximating $\delta w_{edit}^+$, one or more loss functions may be used, such as loss function 134B of equation (2) and loss function 134A of equation (3), below:

$$\mathcal{L}_{RGB}(\delta w^+) = L_{LPIPS}(\tilde{G}^x(w^+ + \delta w^+) \odot (1-r), x \odot (1-r)) + L_{L2}(\tilde{G}^x(w^+ + \delta w^+) \odot (1-r), x \odot (1-r)) \quad (2)$$

$$\mathcal{L}_{CE}(\delta w^+) = H(\tilde{G}^y(w^+ + \delta w^+) \odot r, y_{edited} \odot r) \quad (3)$$

where H denotes the pixel-wise cross-entropy, $L_{LPIPS}$ loss is based on the Learned Perceptual Image Patch Similarity (LPIPS) distance, and $L_{L2}$ is a regular pixel-wise L2 loss. $\mathcal{L}_{RGB}(\delta w^+)$ ensures that the image appearance does not change outside of the region of interest (e.g., the editing region, denoted by dashed lines around the wheel in FIG. 1B), while $\mathcal{L}_{CE}(\delta w^+)$ ensures that the target segmentation edited is enforced within the region of interest. By using these two loss functions, the learned editing vectors 122 may correspond to disentangled features corresponding to the edit. For example, where a wheel is edited, the editing vector 122 may correspond primarily to the wheel (e.g., may be disentangled with respect to other features of the vehicle), and thus when the editing vector is applied on another vehicle to edit another wheel (e.g., to increase the size of the wheel as in image 116B), the edit is to the wheel and not to other features of the vehicle.

In some embodiments, such as when editing human faces or human-like faces (e.g., in out-of-domain images of faces, such as drawings, images of sculptures, paintings, etc.), a third loss function, an identify loss, may be used. The third loss function may be expressed as in equation (4), below:

$$\mathcal{L}_{ID}(\delta w^+) = <R(\tilde{G}^x(w^+ + \delta w^+)), R(x)> \quad (4)$$

where R denotes a pretrained feature extraction network, and $<.,.>$ cosine similarity. As such, for images including humans or human like objects, the final objective function for optimization may be represented as in equation (5), below:

$$\mathcal{L}_{editing}(\delta w^+) = \lambda_1^{editing} \mathcal{L}_{RGB}(\delta w^+) + \lambda_2^{editing} \mathcal{L}_{CE}(\delta w^+) + \lambda_3^{editing} \mathcal{L}_{ID}(\delta w^+) \quad (5)$$

with hyperparameters $\lambda_{1, \ldots, 3}^{editing}$. As such, to learn the editing vectors 122, the only learnable variable may be the editing vector $\delta w^+$ itself, and some (e.g., all) neural networks may be kept fixed during the learning of the editing vector 122.

After learning $\delta w^+$ with the objective function, $\delta w^+$ can be used as an editing vector $\delta w_{edit}^+$. This process may be repeated for any number of different feature types of different objects, and the different editing vectors may then be stored in an editing vector library, and used for interactive editing of images and segmentations masks in real-time or near real-time.

Figure 1B:
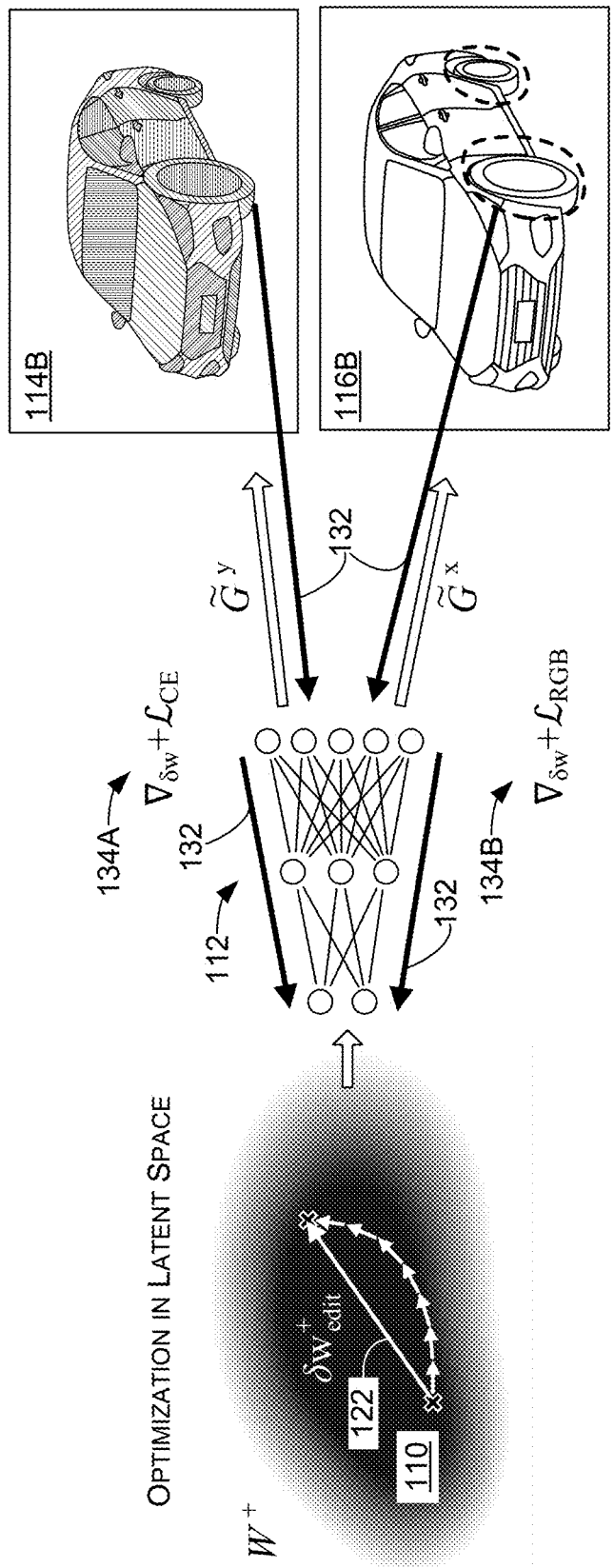
FIG. 1B illustrates a visualization of learning an editing vector in a latent space of a generative adversarial network using backpropagation, in accordance with some embodiments of the present disclosure.

For example, with respect to FIG. 1B, the semantic segmentations 114A may be modified and the latent code z may be optimized for consistency with the new segmentation 114B within the editing region (e.g., using a first loss function 134A), and with the new image 116B appearance outside of the editing region (e.g., using a second loss function 134B). To do this, in embodiments, corresponding gradients may be backpropagated 132 through the shared generator of the GAN 112, with the result being a latent space editing vector 122—e.g., $\delta w_{edit}^+$.

The process 100 may then include real-time editing with editing vectors 108. The latent space editing vectors $\delta w_{edit}^+$ obtained by optimization may be semantically meaningful and disentangled from other attributes or features of the corresponding object. As such, for new images x to be edited, the image may be embedded in the latent space 110 (e.g., $W^+$) and the same editing operations may be directly performed by applying the previously learned $\delta w_{edit}^+$ as $(x', y') = G(w^+ + s_{edit} \delta w_{edit}^+)$ without doing any optimization from scratch again. In this way, the learned editing vectors 122 amortize the iterative optimization that was necessary to achieve the edit initially. For well disentangled editing operations, x' can be used directly as the edited image $x_{edited}$.

$s_{edit}$ may correspond to a scalar editing coefficient, which effectively scales and controls editing magnitude during inference. For example, for $s_{edit} = 0$, no additional editing beyond that corresponding to the editing vector 122 may be performed. For $s_{edit} > 0$, the images may be manipulated with an effectively larger editing operation in latent space 110, leading to more exaggerated effects (e.g., for $s_{edit}$ closer to 1, the scale of the change may be larger than for $s_{edit}$ of 0.1). Similarly, for negative values of $s_{edit}$, the editing operations may be reversed, such that the images are manipulated with an effectively smaller editing operation in latent space 110. As such, varying scales of changes may be applied using the editing vectors 122 along with the scalar editing coefficient, such as to shrink a wheel 25%, enlarge a wheel 25%, enlarge a wheel 50%, etc. In such an example, a graphical user interface (GUI) for editing segmentation masks may include a slider, or another graphical element for changing a scale, and a user 120 may change the scale while visualizing the changes to the generated image 116 and/or the segmentation mask 114 from the GAN 112.

For example, as illustrated in FIG. 1B, an editing vector 122 learned from the segmentation masks 114A and 114B may be used to enlarge the wheels of a vehicle in image 124A (as illustrated in image 124B), of a vehicle in image 126A (as illustrated in image 126B), and/or of a vehicle in image 128A (as illustrated in image 128B). In this way, even though different vehicles from different images may correspond to different points when embedded in the latent space 110, a same editing vector 122 may be used to apply a similar edit as the editing vector corresponds to.

In some embodiments, disentanglement may not be perfect with a given editing vector $\delta w_{edit}^+$, so the editing vector 122 may not translate perfectly to another image. In such instances, vector-based editing with self-supervised refinement may be used. For example, to remove artifacts in other regions of the image (e.g., outside of the editing region) in such instances, additional optimization operations may be performed. For example, the same minimization objectives described above in equations (2), (3), and/or (4) may be used, using the initial prediction y', obtained after applying the editing vector $\delta w_{edit}^+$, as $y_{edited}$. This assumes that the editing vector still induces a plausible segmentation change when applied on other images and that artifacts only arise in the image output of the GAN 112. The RGB (or image) objective $\mathcal{L}_{RGB}$ (e.g., the second loss function 134B) then removes these editing artifacts outside of the editing region, while $\mathcal{L}_{CE}$ ensures the modified segmentation stays as predicted by the editing vector 122.

As such, image editing may be performed in a variety of modes, including real-time editing with editing vectors, vector-based editing with self-supervised refinement, and/or optimization-based editing. For real-time editing with editing vectors, for localized, well-disentangled edits, editing may be performed purely by applying previously learned editing vectors 122 with varying scales to manipulate images at interactive rates. For vector-based editing with self-supervised refinement, image artifacts from localized edits that are not perfectly disentangled with other parts of the image may be removed by addition optimization at test time, while initializing the edit using the learned editing vector 122. Optimization-based editing may correspond to image-specific and large edits that do not transfer to other images via editing vectors, where optimization may performed from scratch.

Figure 3:
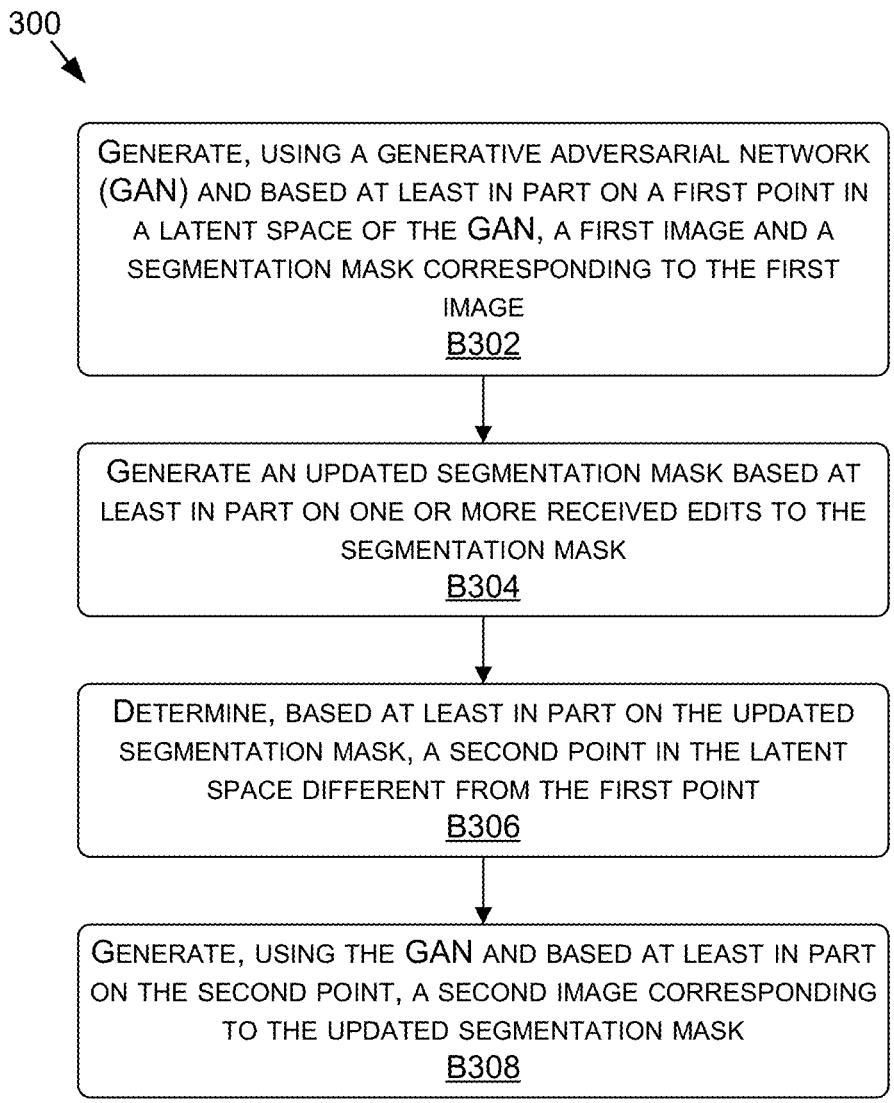
FIG. 3 is a flow diagram showing a method of generating an image using a generative adversarial network based on edits to an segmentation mask, in accordance with some embodiments of the present disclosure.
Figure 4:
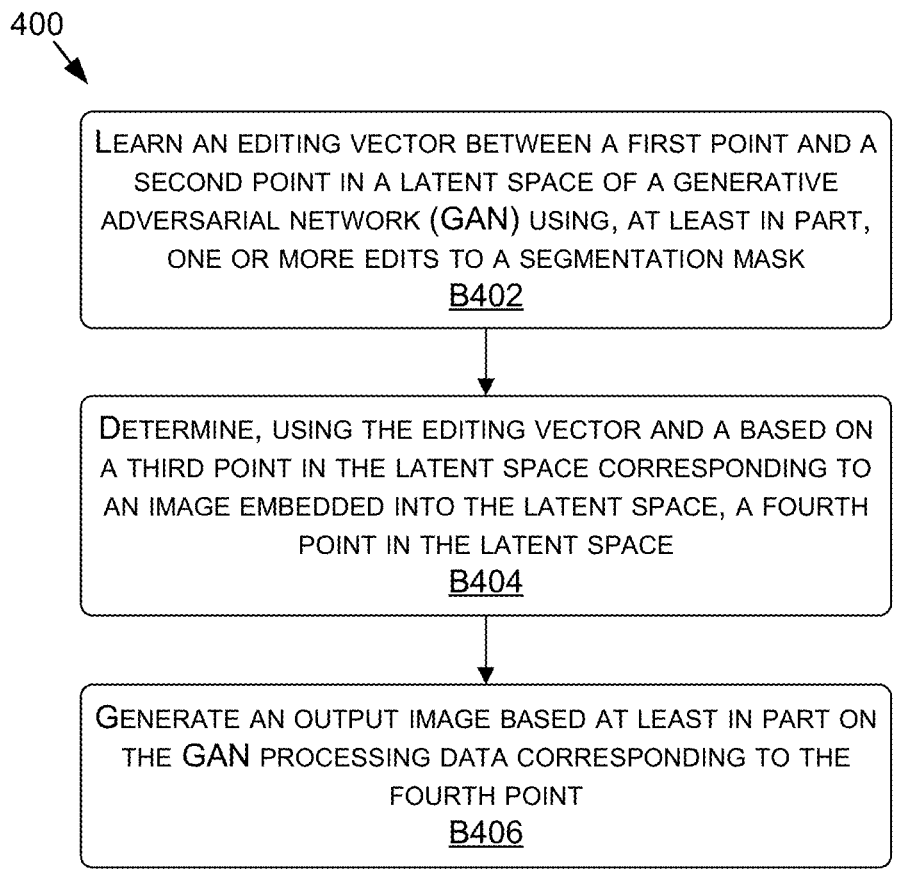
FIG. 4 is a flow diagram showing a method of learning editing vectors in a latent space of a generative adversarial network, in accordance with some embodiments of the present disclosure.

Now referring to FIGS. 3-4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the process 100 of FIGS. 1A-1B. However, these methods 300 and 400 may additionally or alternatively be executed by any one process or system, or any combination of processes and systems, including, but not limited to, those described herein.

With reference to FIG. 3, FIG. 3 is a flow diagram showing a method 300 of generating an image using a generative adversarial network based on edits to a segmentation mask, in accordance with some embodiments of the present disclosure. The method 300, at block B302, includes generating, using a generative adversarial network (GAN) and based at least in part on a first point in a latent space of the GAN, a first image and a segmentation mask corresponding to the first image. For example, the GAN 112 may generate an image 116A using a segmentation branch of the GAN 112 and a semantic segmentation mask 114A using a semantic segmentation branch of the GAN 112. The GAN 112 may use a point 130A in the latent space to generate the image 116A and the mask 114A.

The method 300, at block B304, includes generating an updated segmentation mask based at least in part on one or more received edits to the segmentation mask. For example, a user 120 may edit the segmentation mask 114A to generate an updated segmentation mask 114B The method 300, at block B306, includes determining, based at least in part on the updated segmentation mask, a second point in the latent space different from the first point. For example, optimization may be performed—e.g., using a first loss function 134A, a second loss function 134B, and/or a third loss function (for faces)—over one or more iterations to determine a second point 130B in the latent space 110 that realizes the edits.

The method 300, at block B308, includes generating, using the GAN and based at least in part on the second point, a second image corresponding to the updated segmentation mask. For example, the GAN 112 may use the second point 130B from the latent space 110 to generate the updated image 116B.

With reference to FIG. 4, FIG. 4 is a flow diagram showing a method 400 of learning editing vectors in a latent space of a generative adversarial network, in accordance with some embodiments of the present disclosure. The method 400, at block B402, includes learning an editing vector between a first point and a second point in a latent space of a generative adversarial network (GAN) using, at least in part, one or more edits to a segmentation mask. For example, based on edits to the segmentation mask 114A, optimization may be performed to learn an editing vector 122 between a first point 130A and a second point 130B that amortizes the edits.

The method 400, at block B404, includes determining, using the editing vector and based on a third point in the latent space corresponding to an image embedded into the latent space, a fourth point in the latent space. For example, for another image embedded into the latent space 110 as a third point (e.g., corresponding to image 124A), a fourth point (e.g., corresponding to image 124B) may be identified in the latent space 110 using the editing vector 122.

The method 400, at block B406, includes generating an output image based at least in part on the GAN processing data corresponding to the fourth point. For example, the GAN 112 may use the fourth point to generate the image 124B.

Example Computing Device

Figure 5:
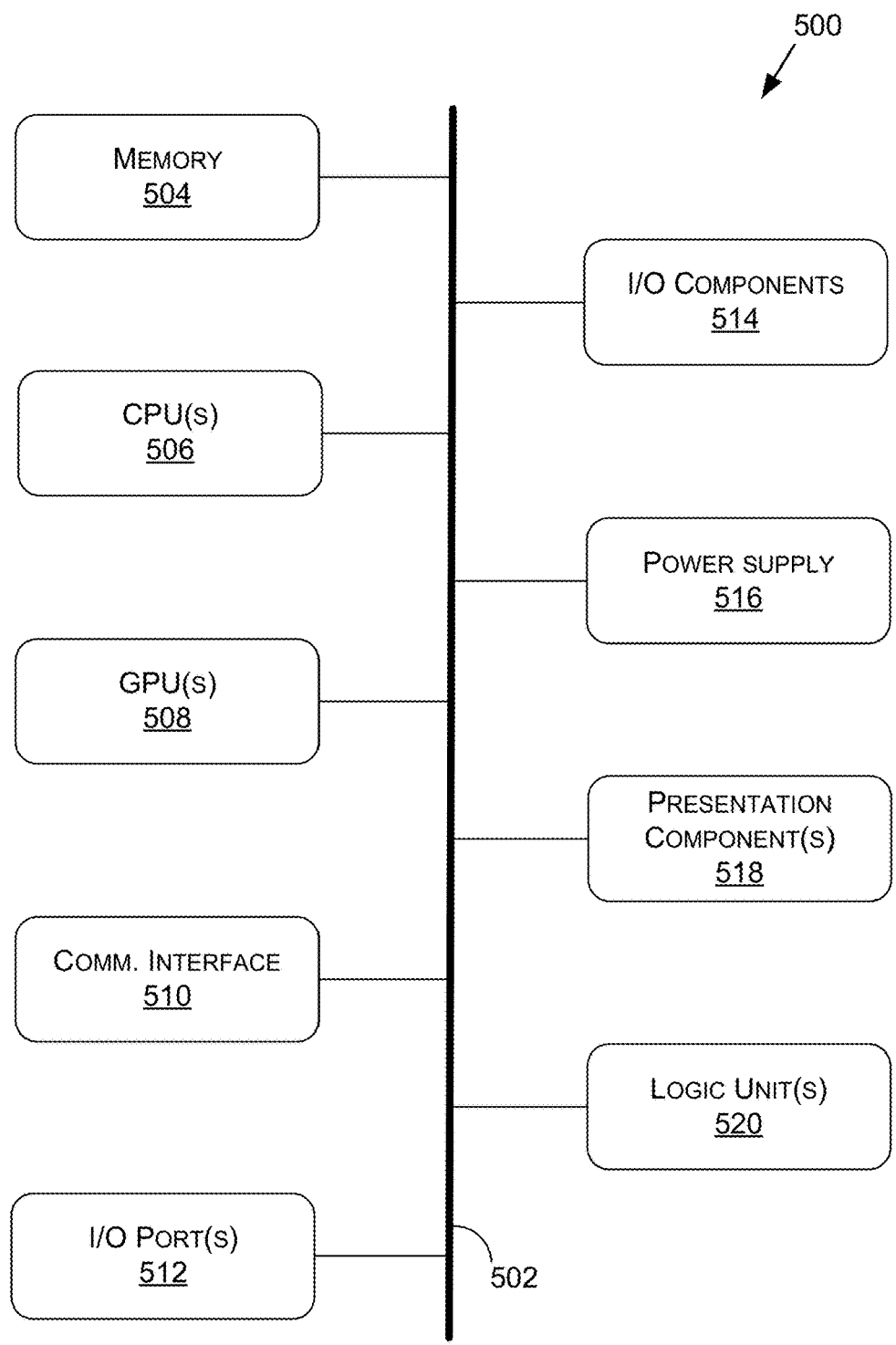
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
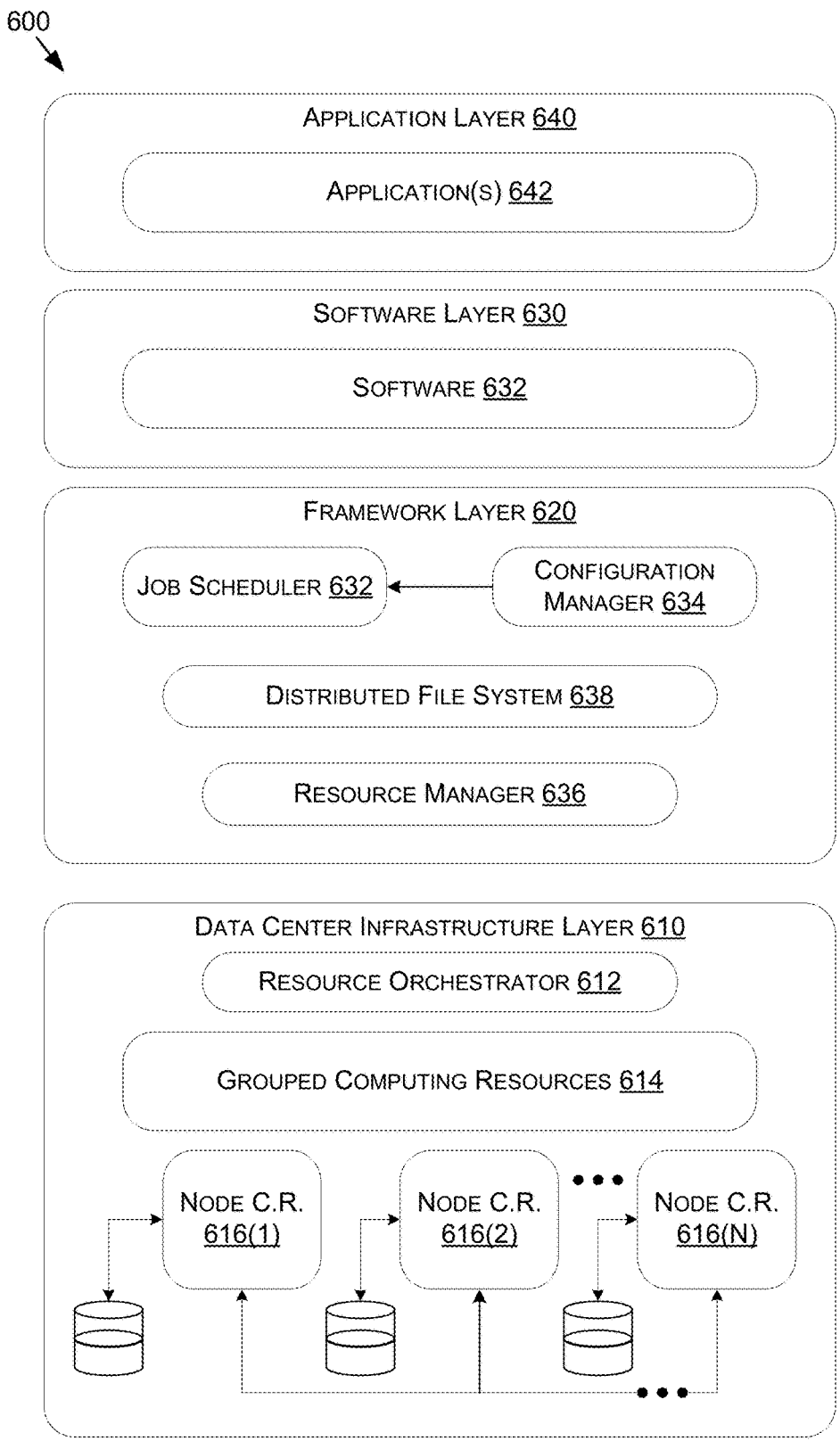
FIG. 6 is a block diagram of an example data center suitable for use in implementing some embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more circuits to:
generate, using a generative adversarial network (GAN) and based at least on a first point in a latent space of the GAN, a first image representing one or more objects and a segmentation mask associated with the one or more objects represented by the first image;
generate, based at least on input data representing one or more modifications to one or more first features of the one or more objects, an updated segmentation mask by at least modifying at least portions of the segmentation mask representing the one or more first features to include one or more second features;
determine a vector based at least on the updated segmentation mask and data that associates the vector with the one or more modifications to the one or more first features;
determine, based at least on the first point and the vector, a second point in the latent space different from the first point, the second point corresponding to the one or more second features; and
generate, using the GAN and based at least on the second point, a second image of the one or more objects that includes the one or more second features.

2. The processor of claim 1, wherein the second point in the latent space is further determined using one or more latent code optimization iterations.

3. The processor of claim 2, wherein at least one latent code optimization iteration of the one or more latent code optimization iterations includes backpropagating one or more gradients through the GAN.

4. The processor of claim 1, wherein the second point in the latent space is determined using one or more loss functions, the one or more loss functions including at least one of:
a first loss function that penalizes one or more differences between the first image and the second image outside of an editing region corresponding to the one or more modifications;

a second loss function that rewards at least one difference between the first image and the second image inside of the editing region corresponding to the one or more modifications; or a third loss function that penalizes one or more changes to an identity of an object between the first image and the second image.

5. The processor of claim 1, wherein the one or more circuits are further to embed the first image into the latent space of the GAN to determine the first point.

6. The processor of claim 1, wherein the one or more circuits are further to generate, using the GAN and based at least on the second point in the latent space of the GAN, another segmentation mask corresponding to the second image.

7. The processor of claim 1, wherein the vector is further associated with an edit type associated with the one or more modifications to the one or more first features.

8. The processor of claim 7, wherein the one or more circuits are further to:
determine, using the vector and based at least on a third point in the latent space of the GAN corresponding to an embedded image, a fourth point in the latent space of the GAN; and
generate, using the GAN and based at least on the fourth point in the latent space of the GAN, a third image corresponding to the embedded image with at least one edit corresponding to the edit type.

9. The processor of claim 1, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

10. The processor of claim 1, wherein the modifying the one or more first features to generate the one or more second features comprises at least one of:
modifying one or more sizes of the one or more first features;
modifying one or more colors of the one or more first features;
modifying one or more shapes of the one or more first features; or
modifying one or more orientations of the one or more first features.

11. The processor of claim 1, wherein the vector is learned using a second segmentation mask associated with one or more second objects that includes the one or more features and a second updated segmentation mask that includes the one or more modifications to the one or more features of the one or more second objects.

12. A system comprising:
one or more processing units comprising processing circuitry to:
learn an editing vector between a first point and a second point in a latent space of a generative adversarial network (GAN), the first point corresponding to a first segmentation mask representing one or more features associated with one or more first objects and the second point corresponding to a first updated segmentation mask representing the one or more features as updated using one or more modifications;
determine a third point in the latent space corresponding to an image, the images depicting one or more second objects that include the one or more features;
determine the editing vector based at least on a second segmentation mask representing the one or more features of the one or more second objects and a second updated segmentation mask representing the one or more features of the one or more second objects as updated using the one or more modifications;
determine, based at least on the editing vector and the third point in the latent space, a fourth point in the latent space that is associated with the one or more features as updated; and
generate an output image based at least on the GAN processing data corresponding to the fourth point, the output image representing the one or more second objects including the one or more features as updated.

13. The system of claim 12, wherein the first segmentation mask is generated based at least on the GAN processing data corresponding to the first point.

14. The system of claim 12, wherein the third point in the latent space is determined based at least on embedding the image into the latent space of the GAN.

15. The system of claim 12, wherein the editing vector is learned by, at least in part, using one or more loss functions through one or more latent code optimization iterations.

16. The system of claim 12, wherein the editing vector is learned by, at least in part, using one or more loss functions, the one or more loss functions including at least one of:
a first loss function that penalizes differences between a first image corresponding to the first point and a second image corresponding to the second point outside of an editing region corresponding to the one or more modifications; or
a second loss function that penalizes a lack of a difference between the first image and the second image inside of the editing region corresponding to the one or more modifications; or
a third loss function that penalizes one or more changes to an identity of the one or more first objects between the first image and the second image.

17. The system of claim 12, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;

a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

18. The system of claim 12, wherein:
the first point is associated with the first segmentation mask representing the one or more features associated with the one or more first objects; and
the second point is associated with the first updated segmentation mask representing the one or more features as updated.

19. The system of claim 12, wherein the one or more processing units further comprise processing circuitry go:
store data representing the editing vector in association with the one or more modifications to the one or more features; and
wherein the determination of the editing vector is further based at least on the editing vector being associated with the one or more modifications.

20. A method comprising:
determining a first point in a latent space that is associated with a segmentation mask representing one or more objects;
generating an updated segmentation mask based at least on updating one or more first features associated with one or more objects as represented by the segmentation mask to include one or more second features;
determining, based at least on the updated segmentation mask, a vector that is associated with the updating the one or more first features to include the one or more second features;
determining, based at least on the first point and the vector, a second point in the latent space different from the first point, the second point corresponding to the one or more second features; and
generating an image using a generative adversarial network (GAN) and based at least on the second point in the latent space.

* * * * *